(12) United States Patent
Claus et al.

(10) Patent No.: US 9,671,227 B2
(45) Date of Patent: Jun. 6, 2017

(54) METHOD FOR EVALUATING OUTPUT SIGNALS OF A ROTATIONAL RATE SENSOR UNIT AND ROTATIONAL RATE SENSOR UNIT

(75) Inventors: Thomas Claus, Tuebingen (DE); Julian Bartholomeyczik, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 415 days.

(21) Appl. No.: 14/238,916

(22) PCT Filed: Jun. 19, 2012

(86) PCT No.: PCT/EP2012/061657
§ 371 (c)(1),
(2), (4) Date: May 12, 2014

(87) PCT Pub. No.: WO2013/023815
PCT Pub. Date: Feb. 21, 2013

(65) Prior Publication Data
US 2014/0298907 A1    Oct. 9, 2014

(30) Foreign Application Priority Data
Aug. 16, 2011   (DE) .................. 10 2011 081 049

(51) Int. Cl.
*G01C 19/5776*   (2012.01)
*G01C 21/16*   (2006.01)

(52) U.S. Cl.
CPC ......... *G01C 19/5776* (2013.01); *G01C 21/16* (2013.01)

(58) Field of Classification Search
CPC ...... G01C 21/16; G01C 21/165; G01C 21/28; G01C 19/56; G01C 19/5776;
(Continued)

(56) References Cited

U.S. PATENT DOCUMENTS 3,231,726 A    1/1966  Williamson
6,421,622 B1   7/2002  Horton et al.
(Continued)

FOREIGN PATENT DOCUMENTS

DE         101 08 196    10/2002
DE       10 2007 060 942    6/2009
(Continued)

OTHER PUBLICATIONS

International Search Report, PCT International Application No. PCT/EP2012/061657, dated Sep. 28, 2012.

*Primary Examiner* — Helen Kwok
(74) *Attorney, Agent, or Firm* — Norton Rose Fulbright US LLP; Gerard Messina

(57) ABSTRACT

A method for evaluating output signals of a rotational rate sensor unit, including providing an n-tuple of angular speed values measured by at least one rotational rate sensor of the rotational rate sensor unit, in a first step; determining an intermediate value as a function of the n-tuple of angular speed values, in a second step; calculating a new change of orientation value as a function of the intermediate value and an earlier change of orientation value stored in a register of the rotational rate sensor unit, in a third step; and storing the new change of orientation value in the register, in a fourth step, repeating the first, second, third, and fourth step until, the new change of orientation value is read out by an external data processing unit connected to the rotational rate sensor unit, and/or, an exceeding of a threshold value is detected.

20 Claims, 3 Drawing Sheets

(58) Field of Classification Search
CPC ..... G01C 19/5769; G01S 19/18; G01S 19/20; G01S 19/23; G01S 19/13; G01S 19/26
USPC ...................................... 73/504.12, 510, 511
See application file for complete search history.

(56) References Cited

U.S. PATENT DOCUMENTS

| | | |
|---|---|---|
| 6,752,017 B2 | 6/2004 | Willig et al. |
| 6,859,727 B2 * | 2/2005 | Bye ................. G01C 21/165 701/510 |
| 7,409,290 B2 * | 8/2008 | Lin ................... G01C 21/005 342/357.27 |
| 7,587,277 B1 | 9/2009 | Wells |
| 8,443,666 B2 | 5/2013 | Classen et al. |
| 8,887,566 B1 * | 11/2014 | Tanenhaus ......... G01C 21/165 702/145 |
| 2002/0008661 A1 * | 1/2002 | McCall ............... G01C 21/165 342/357.3 |
| 2003/0135327 A1 * | 7/2003 | Levine ................ G01C 21/165 701/500 |
| 2005/0040985 A1 * | 2/2005 | Hudson ............... G01C 21/165 342/357.31 |
| 2005/0197769 A1 | 9/2005 | Soehren et al. |
| 2005/0240347 A1 * | 10/2005 | Yang ..................... G01C 21/16 701/500 |
| 2009/0326851 A1 * | 12/2009 | Tanenhaus ............ G01C 21/16 702/96 |

FOREIGN PATENT DOCUMENTS

| | | |
|---|---|---|
| JP | 9-5104 | 1/1997 |
| JP | 10-242953 | 9/1998 |
| JP | 2004-239907 | 8/2004 |
| JP | 2009-75075 | 4/2009 |
| JP | 2009-115545 | 5/2009 |
| JP | 2009-115742 | 5/2009 |
| JP | 2010-151759 | 7/2010 |

* cited by examiner

METHOD FOR EVALUATING OUTPUT SIGNALS OF A ROTATIONAL RATE SENSOR UNIT AND ROTATIONAL RATE SENSOR UNIT

CROSS-REFERENCE TO RELATED APPLICATIONS

This is a 371 patent application of PCT/EP2012/061657 filed Jun. 19, 2012, which claims priority to German Patent Application No. 10 2011 081 049.8 filed Aug. 16, 2011, both applications are expressly incorporated by reference herein in their entireties.

FIELD

The present invention is based on a method for evaluating output signals of a rotational rate sensor system, and on a rotational rate sensor system.

BACKGROUND INFORMATION

Rotational rate sensor systems are generally available. German Patent Application No. DE 101 108 196 A1 describes a rotational rate sensor having Coriolis elements for measuring an angular speed, a first and second Coriolis element being connected to one another via a spring and being excited to oscillations parallel to a first axis, a first and a second detection device detecting a deflection of the first and second Coriolis element based on a Coriolis force acting on the Coriolis elements, so that the difference between a first detection signal of the first detection device and a second detection signal of the second detection device is a function of the Coriolis force and is therefore also a function of the momentary angular speed.

German Patent Application No. DE 10 2007 060 942 A1 describes a multichannel rotational rate sensor that is suitable for measuring rotational rates about axes of rotation oriented perpendicular to one another. In particular, three-channel rotational rate sensors or systems of rotational rate sensors enable a measurement about three mutually independent axes of rotation. Such rotational rate sensors, or systems of rotational rate sensors, are used for example to determine the position of a portable device such as a mobile telephone, a tablet computer, or the like, relative to a reference system. Here the calculation of change of position takes place as a function of the angular changes measured by the rotational rate sensors and provided as output signal.

A method for calculating the change in position is found, for example, in U.S. Pat. No. 3,231,726 A. Because angular changes are not commutative, it is necessary to read out the output signals of the rotational rate sensors from the rotational rate sensor with a high sampling rate. This sampling rate has to be significantly higher than the frequency range in which the movements that are to be measured are found. In this way, complex rotations (rotations about three axes) are decomposed into many smaller rotations. For example, human movements take place in the frequency range below 20 Hz. An error-free integration of these signals typically requires a sampling rate of 100 Hz. A disadvantage is that, due to the high sampling rates, the main processor of the portable device has to be active relatively frequently in order to read out and further process the output signals of the rotational rate sensors. This results in a comparatively high power consumption. In particular in portable devices, due to limited battery capacities, this results in reduction of the battery running time of the portable device.

SUMMARY

An example method according to the present invention and an example rotational rate sensor unit according to the present invention may have the advantage that the data transfer between the rotational rate sensor unit and the external data processing unit, as well as energy consumption, are substantially reduced. In this way, the battery running time can preferably be substantially increased if the example method according to the present invention is used for example in a battery-operated portable device. These advantages are achieved in that the output signals of the rotational rate sensor, or of the multiplicity of rotational rate sensors, are already prepared in a comparatively simple manner in the rotational rate sensor unit by immediately converting the angular speed values into the constantly updated new change of orientation value, taking into account the earlier change of orientation value stored in the register. This new change of orientation value always contains the information about the last change of position of the rotational rate sensor unit. The current change of orientation value is successively summed by multiple repetition of the loop of the first, second, third, and fourth method steps, so that all of the items of change of position information are represented in the current new change of orientation value. The external data processing unit, for example the main processor of the portable device, advantageously requires only the one current change of orientation value in order to register the changes in position that have taken place since the last reading out. For this purpose, a substantially lower sampling rate is adequate, because all of the items of information occurring during a loop no longer have to be constantly queried. This means that a lower quantity of data has to be transmitted and a longer dwell time of the external data processing unit in an energy-saving mode or sleep mode is enabled, thus lowering energy consumption, and in particular increasing the battery running time of the portable device. In addition, the change of orientation value is preferably monitored constantly or intermittently using a threshold monitoring unit, so that errors and imprecisions in the change of orientation value, resulting for example from rounding errors or approximation calculations, can be reduced to a preselected maximum degree. In the fourth method step, the earlier change of orientation value stored in the register is preferably overwritten during each loop with the new change of orientation value. The n-tuple of angular speeds preferably includes a single angular speed about an axis of rotation (n=1) or three angular speeds about three independent axes of rotation (n=3). Given measurement in more than one special direction, the angular speed values are measured for example using a single multichannel rotational rate sensor or a plurality of single-channel rotational rate sensors. The rotational rate sensors preferably include micromechanical rotational rate sensors on a semiconductor substrate that were produced in a semiconductor production process. In an alternative specific embodiment, it is possible for each new orientation value in each loop to additionally also be stored in an output register, fashioned for example as an FIFO (first in first out) register, from which they can be read out successively, preferably corresponding to the temporal sequence in which they were stored, by the external data processing unit.

Advantageous embodiments and developments of the present invention can be learned from the description, with reference to the figures.

According to a preferred specific embodiment, it is provided that after execution of the fifth or sixth method step, in a seventh method step the change of orientation value stored in the register is set to an original value and the method starts over with the first method step. The original value preferably includes a kind of null value, i.e., one in which no change of the orientation has taken place. Advantageously, after the resetting of the change of orientation value stored in the register, errors that have arisen during the calculation of the respective change of orientation value no longer have an effect on the calculation of the new change of orientation value in the following loop. In this way, the maximum occurrence error can be limited. A change of orientation value set to zero, expressed as a change of orientation vector in the form of a quaternion, means that no change of position has taken place, and in particular is expressed as follows:

$$q_{l,o} = \begin{pmatrix} 1 \\ 0 \\ 0 \\ 0 \end{pmatrix}$$

According to a preferred specific embodiment, it is provided that the change of orientation value includes a change of orientation vector, in particular a quaternion. Advantageously, in this way a change of position in three-dimensional space can be represented and further processed comparatively easily. The use of a number system based on quaternions has the advantage that rotations in three-dimensional space can be represented and further processed particularly easily and efficiently. Each quaternion includes four scalar number values, so that the register is designed in particular for the storage of four values per loop.

According to a preferred specific embodiment, it is provided that in the sixth method step it is monitored whether the length of the change of orientation vector calculated in the third method step exceeds a configurable and/or prespecified threshold value. The change of orientation vector is intended to indicate only the change in orientation. For this purpose, the orientation vector should have length one (also as norm or magnitude of the vector), i.e. $|\vec{q}|=1$, where $\vec{q}$ is the change of orientation vector in the form of the quaternion. A deviation of the magnitude of the change of orientation vector from one is possible through a preferably only approximated calculation of the intermediate value. Such an error is added to itself with each loop of the first, second, third, and fourth method steps. This results in an errored calculation of the new change of orientation value in the third method step. Advantageously, this effect is minimized by monitoring the length of the new change of orientation value and comparing it with a configurable and/or prespecified threshold value. If the threshold value is exceeded, the earlier change of orientation value stored in the register is buffered in the output register and/or is read out by the external data processing unit, and is subsequently set to zero. It is also possible for an interrupt to be sent to the external data processing unit by the rotational rate sensor unit, and/or for the new change of orientation value to again be read out by the external data processing unit or stored in the output register.

According to a preferred specific embodiment, it is provided that the number of third method steps carried out since the earlier change of orientation value stored in the register was last set to the original value are counted by a counter, and in the sixth method step it is checked whether the counter has exceeded a configurable and/or prespecified further threshold value. Due to a preferably only approximate calculation of the intermediate value, the danger that the change of orientation value has errors increases with each loop of the first, second, third, and fourth method steps. In addition, the individual errors are compounded with each loop of the first, second, third, and fourth method steps.

A limitation of the maximum number of possible loops of first, second, third, and fourth method steps, without the interim resetting of the earlier change of orientation value stored in the register, advantageously ensures that the error is limited to an acceptable maximum degree. As soon as the maximum possible number of loops has been reached, the new change of orientation value is buffered in the output register, and/or is read out by the external data processing unit, and subsequently the earlier change of orientation value stored in the register is set to zero, so that the subsequently calculated change of orientation value does not build on earlier approximation errors. In addition, it is possible that an interrupt is sent to the external data processing unit by the rotational rate sensor unit.

According to a preferred specific embodiment, it is provided that, if an exceeding of a threshold value is detected in the sixth method step, then in a ninth method step the new and/or the earlier orientation value is stored in an output register that can be read out by the external data processing unit. This has the advantage that the change of position is buffered in the output register before the earlier change of orientation value stored in the register is discarded by the resetting to the original value. In this way it is ensured that no values describing a change of position are lost. The output register can now be read out immediately or at a later time by the external data processing unit.

According to a preferred specific embodiment, it is provided that in the second method step the intermediate value is calculated as a linear function of the n-tuple of angular speed values. Advantageously, a linear function is substantially easier to implement, in particular in the form of a circuit, i.e., in hardware, than is a trigonometric function, which is standardly used for the calculation of change of orientation vectors, preferably quaternions. In particular, the approximation through a linear function takes place as follows:

$$q_l = \begin{pmatrix} \cos(|\vec{\omega}| \cdot T/2) \\ \omega_x/|\vec{\omega}| \cdot \sin(|\vec{\omega}| \cdot T/2) \\ \omega_y/|\vec{\omega}| \cdot \sin(|\vec{\omega}| \cdot T/2) \\ \omega_z/|\vec{\omega}| \cdot \sin(|\vec{\omega}| \cdot T/2) \end{pmatrix} \approx \begin{pmatrix} 1 @ \omega_x \cdot T/2 \\ \omega_y \cdot T/2 \\ \omega_z \cdot T/2 \end{pmatrix}$$

Here, $\omega_{x,y,z}$ corresponds to the respective angular speed about the x, y, and z axes, while T is the sampling time (where T=1/data rate). The computing expense is advantageously substantially reduced by this approximation.

According to a preferred specific embodiment, it is provided that in the third method step the change of orientation value is formed by a multiplication, in particular a quaternion multiplication, of the intermediate value by the earlier change of orientation value stored in the register. The earlier change of orientation value is the change of orientation value calculated respectively in the previously executed loop of the first, second, third, and fourth method steps, and stored in the register in the fourth method step of the preceding loop, or is the change of orientation value reset to the original value. In each loop, such a previous change of orientation value is multiplied by the intermediate value determined in the second method step. The product corresponds to a new change of orientation value that is again stored in the register, so that in the next loop it in turn acts as the previous change of orientation value. The changes of position are thus successively summed in each loop.

According to a preferred specific embodiment, it is provided that in the eighth method step a plurality of change of orientation values read out in fifth method steps are summed by the external data processing unit. Advantageously, in this way a comparatively simple calculation of the effective change of orientation value by the external data processing unit is possible without requiring a high sampling rate for this purpose. In addition, there is an increase in tolerance with regard to the sampling times. The summation of the plurality of change of orientation values preferably takes place in accordance with the condition $|\vec{q}_{\mathit{eff}}|=1$, through multiple normalizing of the effective change of orientation value.

A further subject matter of the present invention is a rotational rate sensor unit for carrying out a method for evaluating output signals, having at least one rotational rate sensor for determining an n-tuple of angular speeds, an evaluation circuit for determining an intermediate value as a function of the n-tuple of angular speeds, and a register for storing a change of orientation value, the evaluation circuit further being configured for the calculation of a new change of orientation value as a function of the intermediate value and as a function of an earlier change of orientation value stored in the register, and the rotational rate sensor unit being fashioned such that the new change of orientation value can be read out by an external data processing unit connected to the rotational rate sensor unit. Advantageously, the rotational rate sensor unit according to the present invention has the register in which each earlier change of orientation value calculated in an earlier loop is to be stored, so that in the following loop a new change of orientation value, based on this earlier value, is to be calculated. On the one hand, in this way no sampling of the rotational rate sensor unit with a comparatively high and energy-intensive sampling rate is necessary, and on the other hand it is nonetheless ensured that no measurement values are lost. In addition, the required data transfer is substantially reduced. The battery running time of a portable device can be substantially increased in this way.

According to a preferred specific embodiment, it is provided that the evaluation circuit is configured so that the earlier change of orientation value stored in the register is reset when the new change of orientation value is read out, a monitoring unit for monitoring the length of the new change of orientation value realized as a change of orientation vector indicates an exceeding of a threshold, and/or a counter for counting the calculations of the new change of orientation value carried out by the evaluation circuit indicates a further exceeding of a threshold. In this way, the precision of the rotational rate sensor unit is advantageously substantially increased.

According to a preferred specific embodiment, it is provided that the rotational rate sensor preferably includes a three-channel rotational rate sensor, and/or the evaluation circuit is implemented in an integrated circuit in the form of an ASIC. Advantageously, an implementation of the evaluation circuit in hardware can be realized so as to be comparatively power-saving, and on a comparatively small wafer surface. In particular, in this way a preparation of the angular speed is enabled without a space-intensive, cost-intensive, and energy-intensive processor or microcontroller (μc).

Exemplary embodiments of the present invention are shown in the figures and are explained in more detail below.

DETAILED DESCRIPTION OF EXAMPLE EMBODIMENTS

Figure 1:
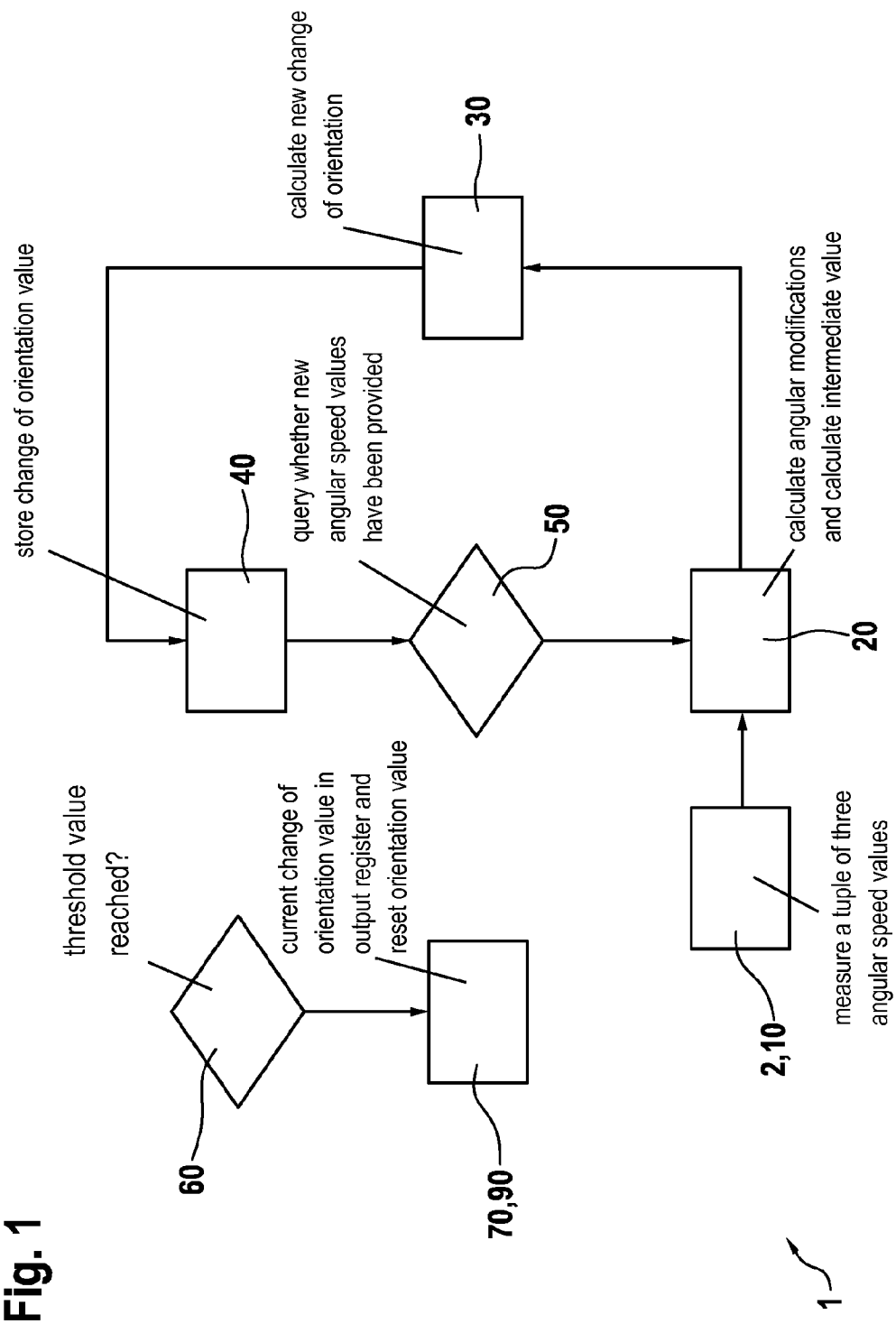
FIG. 1 shows a schematic view of a method according to a first specific embodiment of the present invention.

In the various Figures, identical parts are provided with identical reference characters, and are therefore in general only named or mentioned once.

FIG. 1 shows a schematic view of a method for evaluating output signals of a rotational rate sensor unit 1 according to a first specific embodiment of the present invention. Rotational rate sensor unit 1 has a rotational rate sensor that measures rotational rates or angular speeds $\omega_x$, $\omega_y$, $\omega_z$ about an X-axis, a Y-axis, and a Z-axis, the X, Y, and Z axes being independent of one another.

In a first method step 10, a tuple of three angular speed values $\omega_x$, $\omega_x$, and $\omega_x$ is measured by the rotational rate sensor and provided. In a second method step 20, from the three angular speed values $\omega_x$, $\omega_x$, and $\omega_x$, and using sampling time T (which corresponds to 1/data rate), respective angular modifications $\omega_x \cdot T$, $\omega_y \cdot T$ and $\omega_z \cdot T$ are calculated. As a function of angular modification $\omega_x \cdot T$, $\omega_y \cdot T$, $\omega_z \cdot T$, an intermediate value $q_l$ is then calculated approximately in the form of a quaternion (change of position quaternion) from the linear function $$q_l \approx \begin{pmatrix} 1@\omega_x \cdot T/2 \\ \omega_y \cdot T/2 \\ \omega_z \cdot T/2 \end{pmatrix}$$

In a third method step 30, for the calculation of a new change of orientation value $q_{neu}$, intermediate value $q_l$ is multiplied by an earlier change of orientation value $q_{alt}$ stored in a register of rotational rate sensor unit 1, in the context of a quaternion multiplication. Previous orientation value $q_{alt}$ originates either from a preceding loop of first, second, third, and fourth method step 10, 20, 30, 40, or was previously set to an original value $q_{l,\,0}$ in the context of a seventh method step 70; in particular:

$$q_{l,0} = \begin{pmatrix} 1 \\ 0 \\ 0 \\ 0 \end{pmatrix}$$

In a following, fourth method step 40, change of orientation value $q_{neu}$, which was recalculated in third method step 30, is stored in the register. Here, earlier change of orientation value $q_{alt}$ is overwritten. Subsequently, the loop of first, second, third, and fourth method step 10, 20, 30, 40 is restarted. In an intermediate query 50, in each loop it is queried whether new angular speed values $\omega_x$, $\omega_y$, and $\omega_z$ have been provided by the rotational rate sensor. If new angular speed values $\omega_x$, $\omega_y$, and $\omega_z$ are present, i.e., an angular change was measurable by the rotational rate sensor (because a movement of rotational rate sensor unit 1 took place), then in third method step 30 new change of orientation value $q_{neu}$ is calculated as a function of an intermediate value $q_i$ that was recalculated in second method step 20, and as a function of earlier change of orientation value $q_{alt}$ (corresponding to new orientation value $q_{neu}$ calculated in the previous loop) stored in the register.

The loops of first, second, third, and fourth method steps 10, 20, 30, 40 (and intermediate query 50) are repeated until, in a sixth method step 60, a counter reaches a further configurable and/or prespecified threshold value. The counter counts the number of multiplications carried out in context of third method step 30. In other words, the counter counts how often new change of orientation value q has been recalculated. Because with each new multiplication the size of the possible error increases, the limitation to a maximum number of third method steps 30 via the further configurable and/or prespecified threshold value limits the error. If, in sixth method step 60, it is detected that the further configurable and/or prespecified threshold value t has been reached, then, in a ninth method step 90, current change of orientation value a $q_{neu}$ is stored in an output register, for example an FIFO storage device, and earlier change of orientation value $q_{alt}$ stored in the register is subsequently, in a seventh method step 70, again set to original value $q_{l,\,0}$. Change of orientation value $q_{neu}$ stored in the output storage device is read out by the external data processing unit, in particular a processor of a portable device, so that no value describing the change in position is lost.

Figure 2:
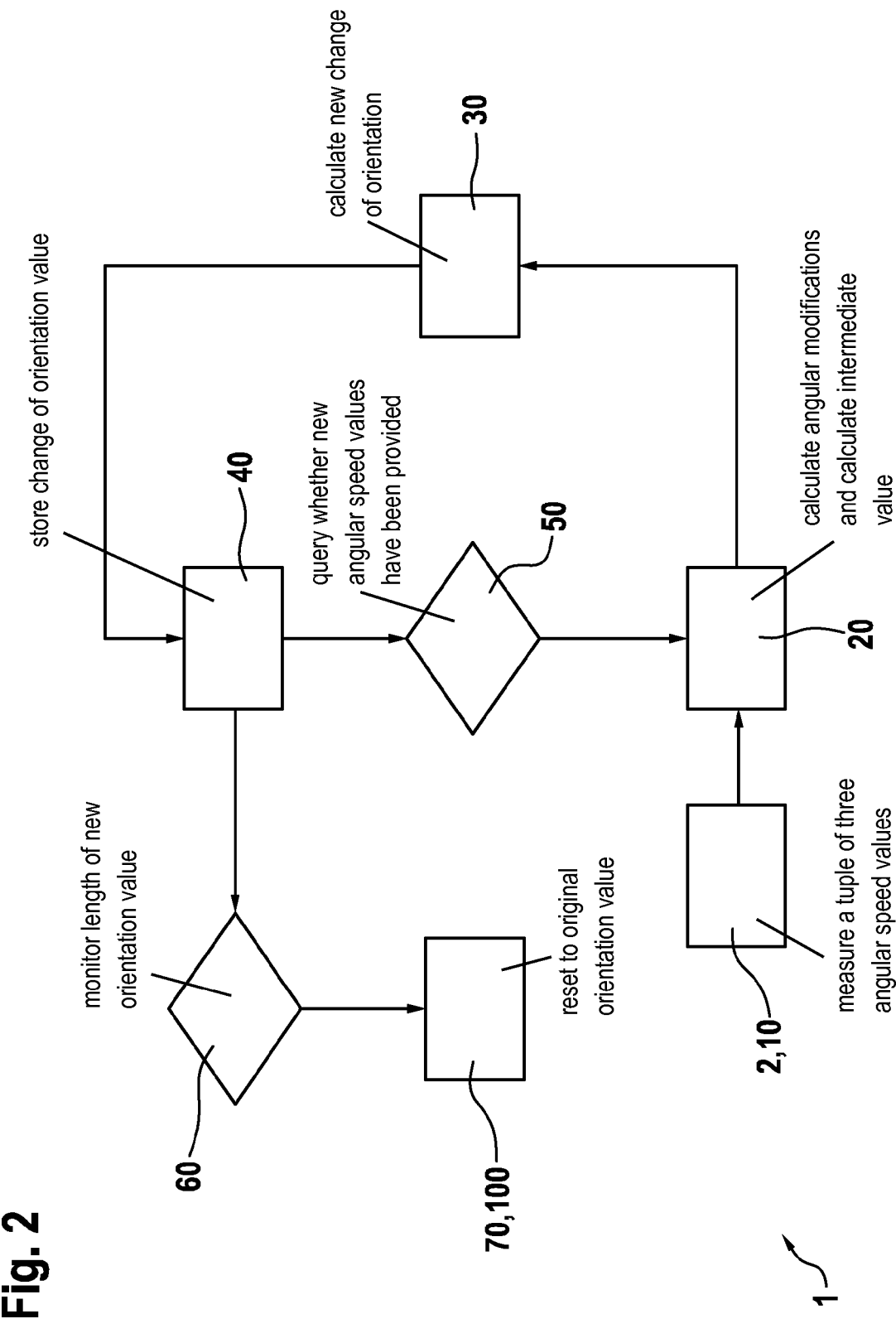
FIG. 2 shows a schematic view of a method according to a second specific embodiment of the present invention.

FIG. 2 shows a schematic view of a method according to a second specific embodiment of the present invention, the second specific embodiment being substantially identical to the first specific embodiment illustrated on the basis of FIG. 1; but, differing from the first specific embodiment, in the second specific embodiment the length of new orientation value $q_{neu}$ is monitored in sixth method step 60. If the length of change of orientation vector $q_{neu}$ calculated in third method step 30 exceeds a configurable and/or prespecified threshold value, then in a tenth method step 100 an interrupt signal is produced. Earlier change of orientation value gait is then, in seventh method step 70, reset to the original value $q_{l,\,0}$. Current change of orientation value $q_{neu}$ is optionally discarded, read out by the external data processing unit, and/or stored in the output register, for example an FIFO storage device.

Figure 3:
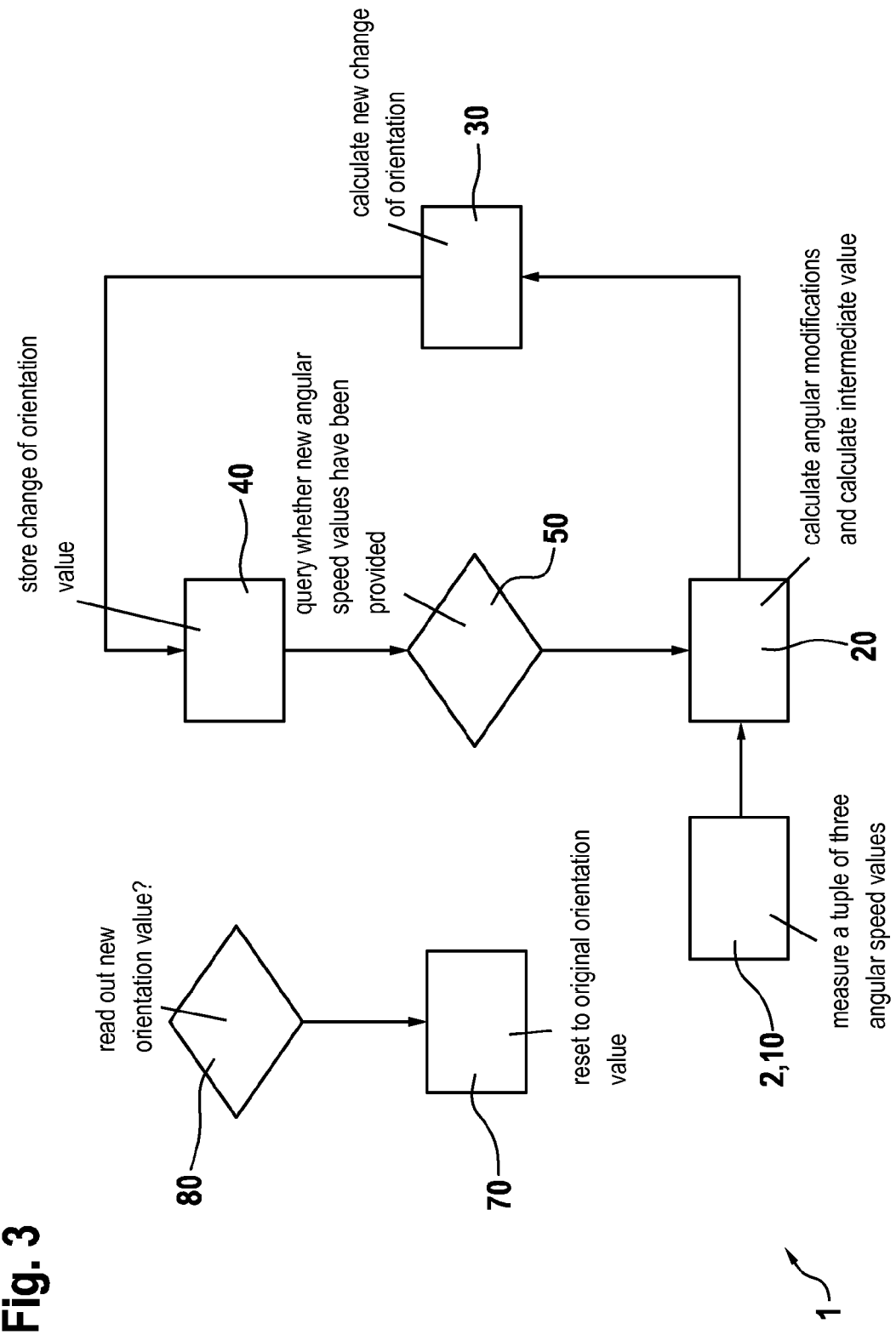
FIG. 3 shows a schematic view of a method according to a third specific embodiment of the present invention.

FIG. 3 shows a schematic view of a method according to a third specific embodiment of the present invention, the third specific embodiment being substantially identical to the first specific embodiment illustrated on the basis of FIG. 1; but, differing from the first specific embodiment, in the third specific embodiment the loops of first, second, third, and fourth method step 10, 20, 30, 40 (and intermediate step 50) are repeated until, in a fifth method step 80, the external data processing unit reads out new change of orientation value a $q_{neu}$, or a reading out by the external data processing unit is detected. Alternatively, it is also possible that here the earlier change of orientation value $q_{alt}$ stored in the register is read out by the external data processing unit. The read-out change of orientation value $q_{neu}$ now represents all positional changes since the last reading out. After the reading out of change of orientation value earlier change of orientation value $q_{alt}$ stored in the register is again set, in a seventh method step 70, to original value $q_{l,\,0}$. It is possible that, in an eighth method step, the external data processing unit is used to sum a plurality of change of orientation values $q_{neu}^{i}$, read out from rotational rate sensor unit 1 in fifth method steps 80, within the external data processing unit to form an effective change of orientation value $q_{eff}$.

What is claimed is:

1. A method for evaluating output signals of a rotational rate sensor unit, comprising:
    providing an n-tuple-of angular speed values measured by at least one rotational rate sensor of the rotational rate sensor unit, in a first method step;
    determining an intermediate value as a function of the n-tuple of angular speed values, in a second method step;
    calculating a new change of orientation value as a function of the intermediate value and as a function of an earlier change of orientation value stored in a register of the rotational rate sensor unit, in a third method step; and
    storing the new change of orientation value in the register, in a fourth method step;
    wherein the first, second, third, and fourth method steps are repeated until, at least one of: i) in a fifth method step, the new change of orientation value is read out by an external data processing unit connected to the rotational rate sensor unit, and ii) in a sixth method step, an exceeding of a threshold value is detected, and
    wherein a current change of orientation value is successively summed by multiple repetition of a loop including the first, second, third, and fourth method steps, so that all of the items of change of position information are represented in the new change of orientation value.

2. The method as recited in claim 1, wherein the earlier change of orientation value stored in the register is set, in a seventh method step, to an original value, in which no change of the orientation has taken place, after execution of the fifth or sixth method step, and the method being restarted with the first method step.

3. The method as recited in claim 1, wherein the new change of orientation value includes a change of a quaternion.

4. The method as recited in claim 1, wherein the sixth method step includes detecting whether a length of the new change of orientation value calculated in the third method step exceeds at least one of a configurable threshold value and a prespecified threshold value.

5. The method as recited in claim 1, wherein the sixth method step includes counting by a counter the number of third method steps carried out since the earlier change of orientation value stored in the register was last set to an original value, in which no change of the orientation has taken place, and detecting whether the counter exceeds at least one of a configurable further threshold value and a prespecified further threshold value.

6. The method as recited in claim 1, further comprising:
    storing at least one of the new and the earlier orientation value in an output register that can be read out by the external data processing unit, the storage taking place if, in the sixth method step, an exceeding of a threshold is detected.

7. The method as recited in claim 1, wherein at least one of: i) in the second method step, the intermediate value is calculated as a linear function of the n-tuple of angular speed values, and ii) in the third method step, the new change of orientation value is calculated by a quaternion multiplication of the intermediate value by the earlier change of orientation value stored in the register.

8. The method as recited in claim 2, wherein a plurality of change of orientation values read out from the rotational rate sensor unit in fifth method steps is summed, in an eighth method step, by the external data processing unit to form an effective change of orientation value.

9. A rotational rate sensor unit, comprising:
- at least one rotational rate sensor to determine an n-tuple of angular speeds;
- an evaluation circuit to determine an intermediate value as a function of the n-tuple of angular speeds; and
- a register to store a change of orientation value;
- wherein the evaluation circuit further being configured to calculate a new change of orientation value as a function of the intermediate value and as a function of an earlier change of orientation value stored in the register, and the rotational rate sensor unit is fashioned in such a way that the new change of orientation value is capable of being read out by an external data processing unit connected to the rotational rate sensor unit, and wherein a current change of orientation value is successively summed by multiple repetition of a loop including the first, second, third, and fourth method steps, so that all of the items of change of position information are represented in the new change of orientation value.

10. The rotational rate sensor unit as recited in claim 9, wherein the evaluation circuit is configured to reset the earlier change of orientation value stored in the register when the new change of orientation value is read out.

11. The rotational rate sensor as recited in claim 9, further comprising:
- a monitoring unit to monitor a length of the new change of orientation value realized as a change of orientation vector as indicating an exceeding of a threshold value.

12. The rotational rate sensor unit as recited in claim 9, further comprising:
- a counter to count the calculations of the new change of orientation value carried out by the evaluation circuit to indicate an exceeding of a threshold value.

13. The rotational rate sensor unit as recited in claim 9, wherein the rotational rate sensor includes a three-channel rotational sensor.

14. The rotational rate sensor unit as recited in claim 9, wherein the evaluation circuit is an ASIC.

15. The rotational rate sensor unit as recited in claim 9, wherein the intermediate value is calculated as a linear function of the n-tuple of angular speed values.

16. The rotational rate sensor unit as recited in claim 9, wherein the intermediate value is calculated as a linear function of the n-tuple of angular speed values, and wherein the approximation through a linear function is performed as follows:

$$q_l = \begin{pmatrix} \cos(|\vec{\omega}| \cdot T/2) \\ \omega_x/|\vec{\omega}| \cdot \sin(|\vec{\omega}| \cdot T/2) \\ \omega_y/|\vec{\omega}| \cdot \sin(|\vec{\omega}| \cdot T/2) \\ \omega_z/|\vec{\omega}| \cdot \sin(|\vec{\omega}| \cdot T/2) \end{pmatrix} \approx \begin{pmatrix} 1 @ \omega_x \cdot T/2 \\ \omega_y \cdot T/2 \\ \omega_z \cdot T/2 \end{pmatrix}$$

where, $\omega_{x,y,z}$ corresponds to the respective angular speed about the x, y, and z axes, and where T is the sampling time, where T=1/data rate.

17. The method as recited in claim 1, wherein in the second method step the intermediate value is calculated as a linear function of the n-tuple of angular speed values.

18. The method as recited in claim 1, wherein in the second method step the intermediate value is calculated as a linear function of the n-tuple of angular speed values, and wherein the approximation through a linear function is performed as follows:

$$q_l = \begin{pmatrix} \cos(|\vec{\omega}| \cdot T/2) \\ \omega_x/|\vec{\omega}| \cdot \sin(|\vec{\omega}| \cdot T/2) \\ \omega_y/|\vec{\omega}| \cdot \sin(|\vec{\omega}| \cdot T/2) \\ \omega_z/|\vec{\omega}| \cdot \sin(|\vec{\omega}| \cdot T/2) \end{pmatrix} \approx \begin{pmatrix} 1 @ \omega_x \cdot T/2 \\ \omega_y \cdot T/2 \\ \omega_z \cdot T/2 \end{pmatrix}$$

where, $\omega_{x,y,z}$ corresponds to the respective angular speed about the x, y, and z axes, and where T is the sampling time, where T=1/data rate.

19. The method as recited in claim 1, wherein the sampling rate is less than about 100 Hz.

20. The rotational rate sensor unit as recited in claim 9, wherein the sampling rate is less than about 100 Hz.

* * * * *